No. 614,071. Patented Nov. 8, 1898.
W. W. ANNABLE.
DRIVING GEAR FOR BICYCLES.
(Application filed Nov. 22, 1897.)
(No Model.)
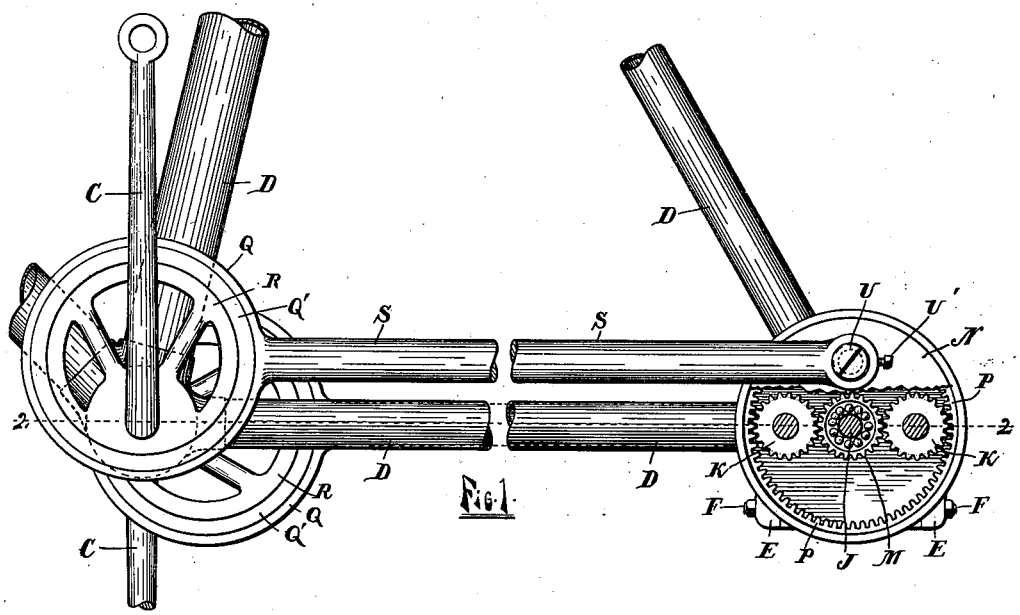
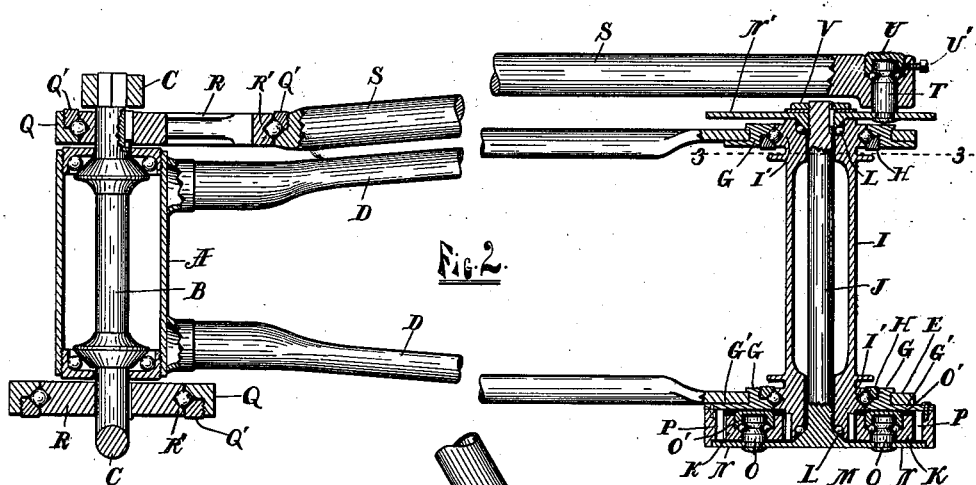
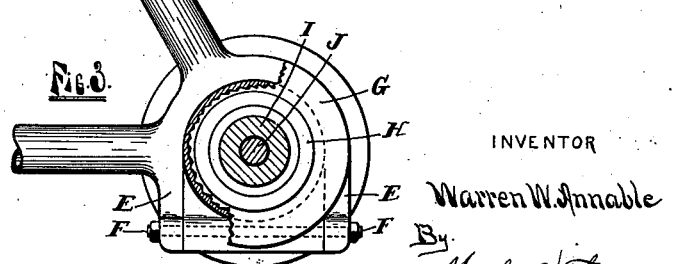
WITNESSES:
INVENTOR
Warren W. Annable
By
Moulton & Flanders
Attorneys.

UNITED STATES PATENT OFFICE.

WARREN W. ANNABLE, OF GRAND RAPIDS, MICHIGAN, ASSIGNOR OF ONE-HALF TO G. STEWART JOHNSON, OF SAME PLACE.

DRIVING-GEAR FOR BICYCLES.

SPECIFICATION forming part of Letters Patent No. 614,071, dated November 8, 1898.

Application filed November 22, 1897. Serial No. 659,370. (No model.)

*To all whom it may concern:*

Be it known that I, WARREN W. ANNABLE, a citizen of the United States, residing at Grand Rapids, in the county of Kent and State of Michigan, have invented certain new and useful Improvements in Driving-Gears for Bicycles; and I do hereby declare the following to be a full, clear, and exact description of the invention, such as will enable others skilled in the art to which it appertains to make and use the same.

My invention relates to improvements in the driving-gears of bicycles; and its object is to provide the same with certain new and useful features hereinafter more fully described, and particularly pointed out in the claims, reference being had to the accompanying drawings, in which—

Figure 1 is a side elevation of a device embodying my invention with a portion broken away; Fig. 2, a plan view of the same, partly in horizontal section, on the line 2 2 of Fig. 1; and Fig. 3, a detail in section on the line 3 3 of Fig. 2, with parts broken away.

Like letters refer to like parts in all of the figures.

A represents the crank-hanger, in which is journaled a crank-shaft B, having the cranks C C attached to its respective ends. D represents the frame. These parts may be of the usual construction. The rear end of the said frame is provided with clips E, tightened by bolts F, and in which clips are rotatively-adjustable ball-races G, provided with adjustable rings H. One of said races is provided with an outwardly-extended flange G', to the periphery of which flange is attached an internal gear P. The hub I of the rear wheel is provided with circumferential bearing-grooves I' near its ends, which grooves engage bearing-balls in the races G. Said hub is also provided at its ends with ball-races L for ball-bearings for a shaft J, rotative in the axis of said hub, and provided with disks N and N' at its ends, the latter disk being longitudinally adjustable on said shaft to adjust said bearings and secured by a washer and jam-nut V. To each of said disks are attached crank-pins T, provided with ball-grooves, and engaging said pins are connecting-rods S, having ball-races and take-up cups U surrounding said pins and held by set-screws U'. The connecting-rods S extend forward and connect with eccentric-straps Q, having ball-races and adjustable rings Q' and surrounding eccentrics R, secured to the respective ends of the shaft B and provided with peripheral ball-grooves R'. Attached to the disk N and projecting from its inner surface are studs O, provided with ball-grooves, on which studs are journaled planet-gears K, having ball-races and take-up cups O' surrounding said studs. Said gears engage the fixed gear P and the pinion M, and the periphery of the disk N engages and runs freely in a recess in the gear P, thus serving to inclose the said gears and keep out any dust and grit. By connecting the rods S to the respective ends of the shaft rotative in the axis of the rear wheel I am able to utilize a single set of gears to transmit motion to the wheel through two connecting-rods arranged "quartering" to each other and acting alternately. The ball-race of the shaft-bearing rotates, and thus the wear is distributed evenly upon the same. The bolts F can be slackened and the ball-race G turned from time to time, and thus the wear may also be distributed evenly thereon.

The parts are all effectually protected from the dust and grit.

The various bearings are made adjustable for wear and the device made more simple, durable, and cheap, as compared to prior devices.

The operation of the device is obvious and needs no further description.

Having thus fully described my invention, what I claim, and wish to secure by Letters Patent, is—

1. In a bicycle, a frame having clips, bearings rotatively adjustable in said clips, a fixed internal gear attached to one of said bearings, a hub rotative in said bearings, a pinion on said hub, a shaft independently rotative in bearings within said hub, means for rotating said shaft, and planet-gears attached to said shaft and rotative therewith and connecting said internal gear and said pinion, substantially as described.

2. In a bicycle, a frame having clips at its rear end embracing ball-races rotatively adjustable therein, an outwardly-extended flange on one of said ball-races, an internal gear attached to the periphery of said flange, a hub rotative in said bearings and having internal bearings and a pinion, a shaft independently rotative in said internal bearings, means for rotating said shaft, a disk on the end of said shaft having its periphery engaging a recess in the internal gear and rotating therein, studs on said disk, and planet-gears rotative on said studs, and connecting the internal gear and the pinion, substantially as described.

3. In a bicycle, a hub rotative within bearings in the frame, a pinion fixed on the end of said hub, bearings within said hub, an independently-rotative shaft in said bearings in the hub, a fixed internal gear surrounding said pinion, a disk on said shaft engaging a recess in said internal gear and rotative therein, one or more studs on said disk, planet-gears rotative on said studs and connecting the fixed gear and the pinion, an adjustable disk on the other end of said shaft, connecting-rods attached to said disks and a crank-shaft, cranks, eccentrics, and straps, to actuate said rods, substantially as described.

4. In a bicycle, ball-races in the frame having adjustable rings forming one side of the ball-race, a hub having circumferential grooves opposite said ball-races, and internal ball-races in its ends, and a pinion on one end, a shaft independently rotative in said hub, and having cone-bearings opposite the ball-races in the hub, a fixed internal gear surrounding said pinion, a disk on the end of said shaft, studs on said disk having grooves, planet-gears on said studs engaging the fixed gear and the pinion, ball-races in said gears opposite said grooves in the studs, and adjustable caps in said gears, substantially as described.

5. In a bicycle, a frame having clips at its rear end, rotatively-adjustable ball-races in said clips, having adjustable rings and flanges, an internal gear attached to one of said flanges, a hub having circumferential grooves opposite the said ball-races, balls in said races and grooves, a pinion on one end of said hub and in the axis of said internal gear, ball-races in the ends of said hub, a shaft independently rotative in said hub, having cone-bearings opposite said races, disks on the ends of said shaft, one of which engages a recess in the internal gear and rotates therein, studs on said disks having circumferential grooves, planet-gears rotative on said studs and engaging the internal gear and the pinion, ball-races in said gears, balls in said races, and adjustable caps in said gears, crank-pins in said disks, a crank-shaft having cranks and eccentrics attached, and straps and rods connecting said crank-shaft and the crank-pins, substantially as described.

In testimony whereof I affix my signature in presence of two witnesses.

WARREN W. ANNABLE.

Witnesses:
LUTHER V. MOULTON,
LEWIS E. FLANDERS.